July 27, 1965
W. H. HOLLOMAN
3,196,993
RELEASABLE CONNECTOR FOR CONNECTING STRUCTURAL
ELEMENTS IN BUILDINGS, FURNITURE
AND OTHER ARTICLES
Filed Nov. 20, 1962
3 Sheets-Sheet 1
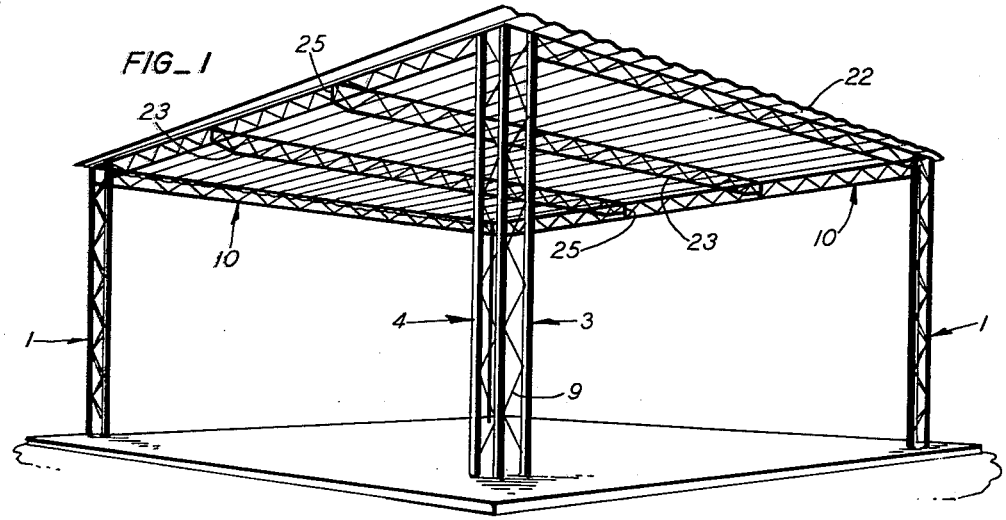
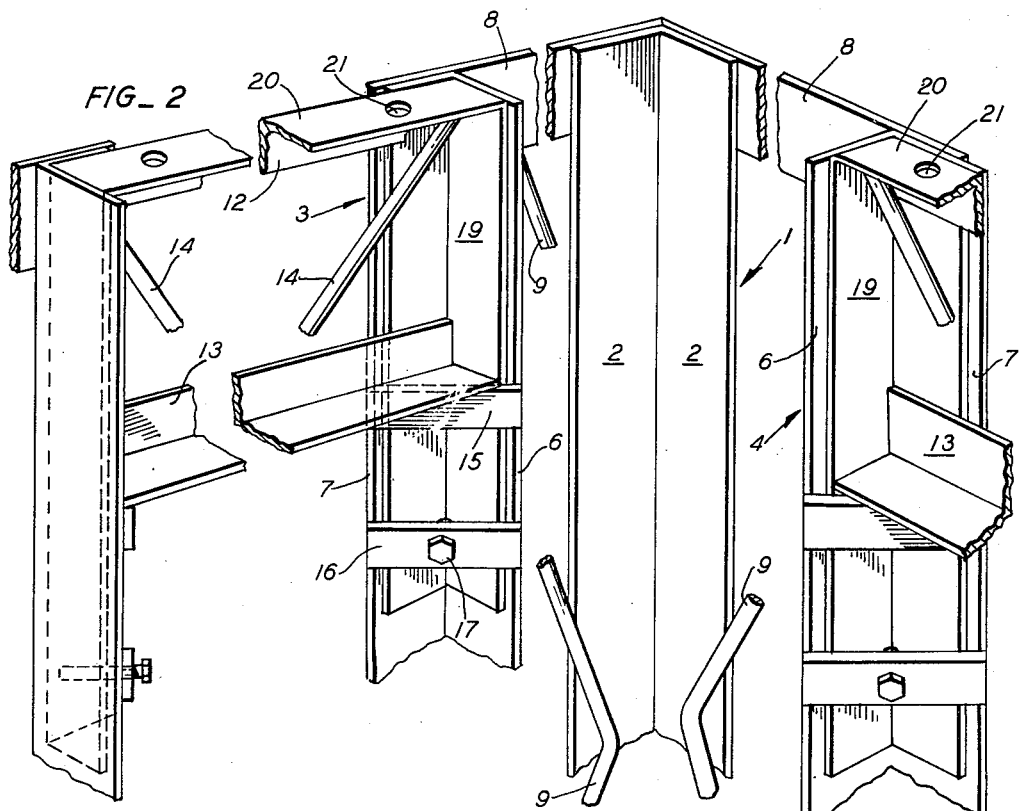
INVENTOR.
WILLIAM H. HOLLOMAN
BY
Boyken, Mohler + Foster
ATTORNEYS July 27, 1965
W. H. HOLLOMAN
3,196,993
RELEASABLE CONNECTOR FOR CONNECTING STRUCTURAL
ELEMENTS IN BUILDINGS, FURNITURE
AND OTHER ARTICLES
Filed Nov. 20, 1962
3 Sheets-Sheet 2
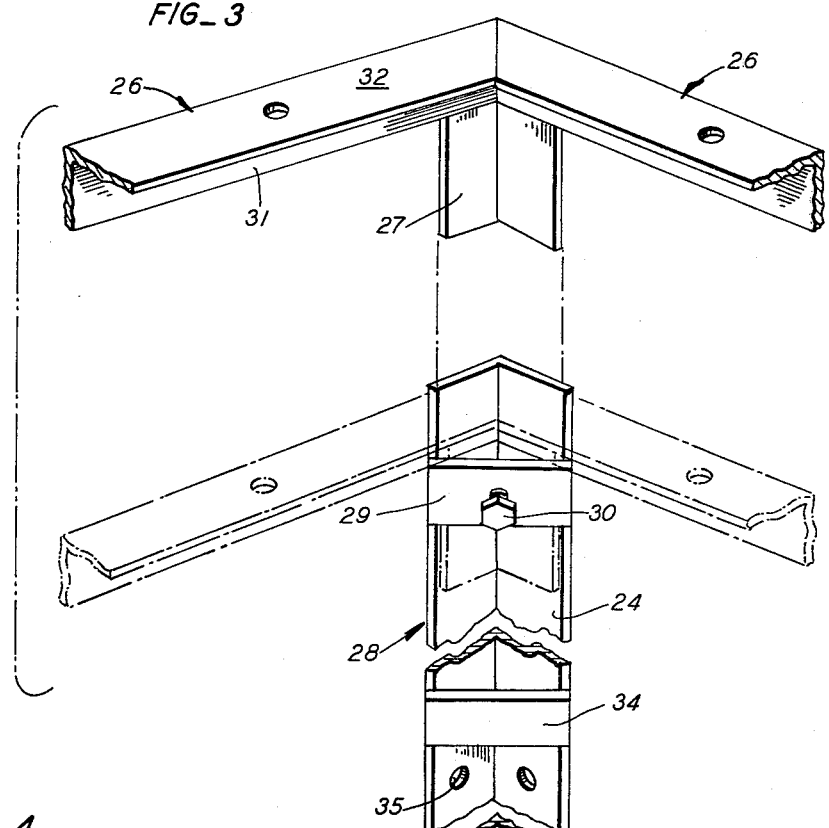
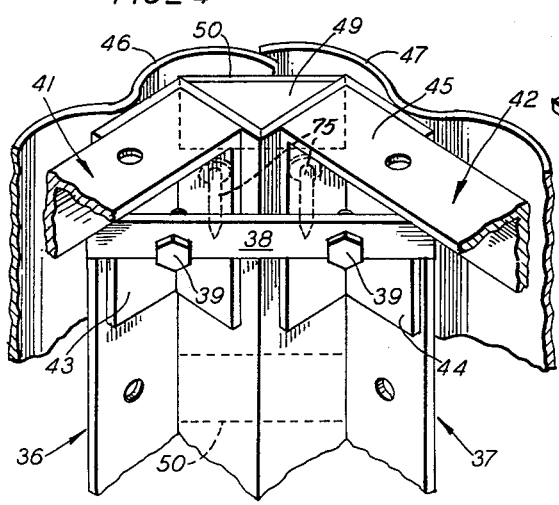
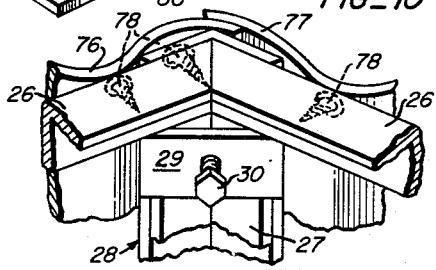
INVENTOR
WILLIAM H. HOLLOMAN
BY
Boyken, Mohler & Foster
ATTORNEYS July 27, 1965 W. H. HOLLOMAN 3,196,993
RELEASABLE CONNECTOR FOR CONNECTING STRUCTURAL
ELEMENTS IN BUILDINGS, FURNITURE
AND OTHER ARTICLES
Filed Nov. 20, 1962 3 Sheets-Sheet 3
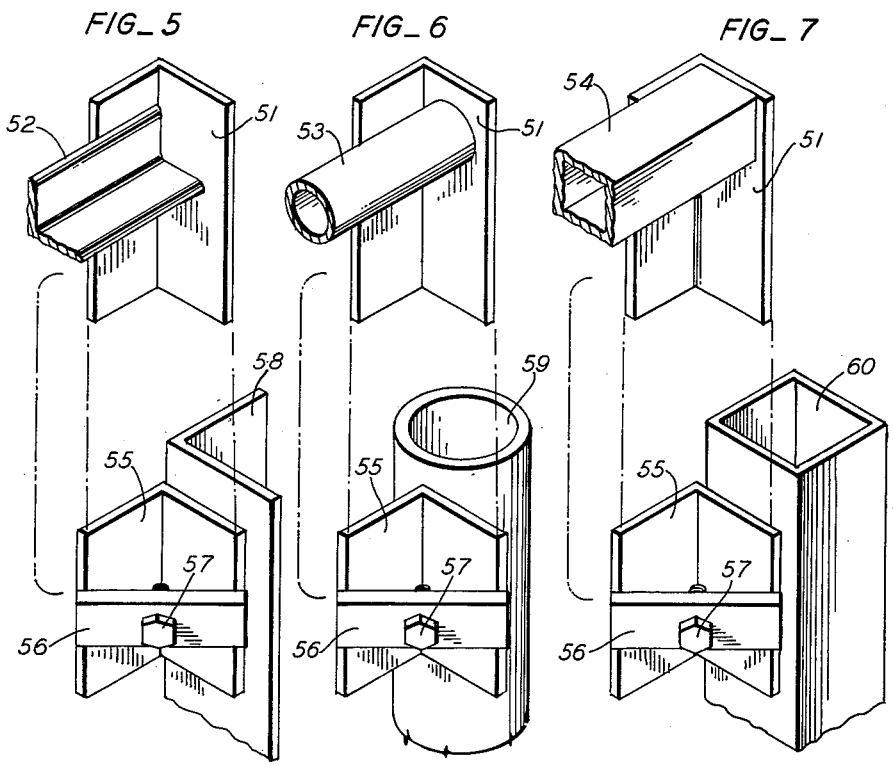
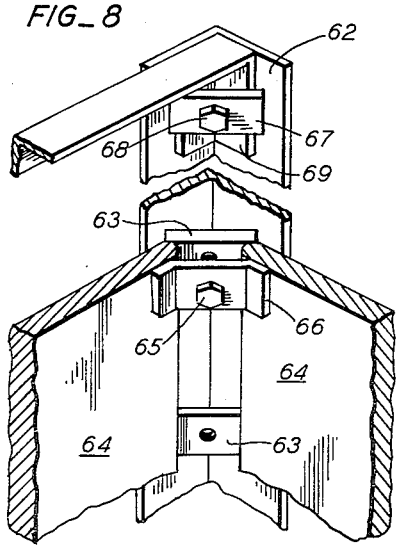
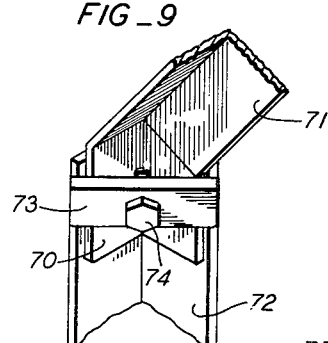
INVENTOR.
WILLIAM H. HOLLOMAN
BY
Boyken, Mohler & Foster
ATTORNEYS 3,196,993
RELEASABLE CONNECTOR FOR CONNECTING STRUCTURAL ELEMENTS IN BUILDINGS, FURNITURE AND OTHER ARTICLES
William H. Holloman, 4843 Geneva Ave., Concord, Calif.
Filed Nov. 20, 1962, Ser. No. 238,940
9 Claims. (Cl. 189—36)

This invention relates to connector and locking means for connecting structural elements in a building, furniture and other articles where the various frame members are to be secured together.

One of the objects of the invention is the provision of simple, rugged and economical connector means that quickly and easily effects a rigid connection between the structural frame members without requiring riveting, drilling of holes, and specially formed bolts, etc.

In explanation of the above, where posts, beams, rafters, shelves, studding etc. are required in fabricating a building, patio cover or patio room, tool house, etc., the present invention provides connecting means as part of the various frame members, and which frame members including the connecting means may be prefabricated in the desired dimensions and then quickly connected to form the building. Furniture is mentioned since certain types of cabinets, cases, tables may be formed from elements that are similar to the elements used in buildings and the same connecting structure may be used.

Other objects and advantages will appear in the description and drawings.

In the drawings:

FIG. 1 illustrates one form of a building structure in which the present connector is used.

FIG. 2 is a fragmentary perspective view of one upper corner of the structure shown in FIG. 1, certain elements being broken in length and in cross section.

FIG. 3 is an isometric exploded view of a pair of connector elements, the dot-dash lines indicating one of the elements in assembled relation to the other.

FIG. 4 is an isometric assembled view at the upper corner of a building in combination with a nailing strip and with corrugated siding or sheathing, the connector members being at the corner.

FIGS. 5, 6 and 7 show exploded isometric views of several applications of the connector elements with structural members of different types.

FIG. 8 is an isometric view of a slightly modified form of the invention in which the connector means is in a form that permits the clamping of walls to the corner posts.

FIG. 9 is an isometric view of a connector element with a structural member which could form an inclined rafter.

FIG. 10 is an isometric assembled view of the connector elements of FIG. 3 with corrugated sheathing secured thereto.

While all of the views show the basic structure that is employed as the connecting means, the different examples of the use of the connecting means will show the versatility of the system.

FIGS. 1 and 2 show structure as specifically applied to a patio room requiring more rigidity in the frame than in smaller structures.

FIG. 1 illustrates a patio room in which there are four corner post assemblies, each of which embodies the structure shown more in detail in FIG. 2.

In each corner post assembly there are three corner posts, each being a vertically disposed angle strip, there being a central post generally designated 1, the sides 2 of which are at a right angle to each other with the reentrant angle defined by the two sides facing into the room. The two other posts 3, 4 are equally spaced from the post 1, and are also vertically disposed angle strips each having sides 6, 7 disposed at a right angle to each other. The sides 7 of posts 3, 4 are each coplanar with one of the sides 2 of post 1 while the other side 6 is nearest the central post 1 and projects into the room area.

Horizontal, elongated plates 8 extend between the upper ends of the several post assemblies and may be respectively welded to one of the sides of each of the posts, while angularly extending reinforcing truss rods 9 may extend between and be welded to the corner post 1 and to each of the auxiliary posts 3, 4 as best seen in FIG. 1 whereby the corner post assemblies will be quite rigid.

The roof supporting beams as illustrated in FIG. 1 comprise horizontally extending beam assemblies, each generally designated 10 extending between the upper ends of each corner post assembly to form a generally rectangular frame.

Each of these beam assemblies comprises an upper angle strip 12 and a lower angle strip 13 parallel therewith and spaced therebelow. The strips 12, 13 of each beam assembly may be connected by truss rods 14 extending in zig-zag arrangement and welded to the strips 12, 13.

The present invention is concerned principally with connecting these beams with the corner post assemblies. It is obvious that the corner post assemblies and beam assemblies may be prefabricated to predetermined lengths.

In the example of FIGS. 1 and 2, spaced below the upper end of each post 3, 4 and extending across the reentrant angle formed by the sides of each strip, is a horizontally disposed metal strap 15 that is welded to the edges of the sides 6, 7 of each post 3, 4, and spaced below each strap 15 is a similar strap 16 that is also welded to the edges of the sides 6, 7 of each post. These may be called retaining elements and the lower retaining element is preferably drilled and tapped intermediate its ends for threadedly supporting or locking screw 17, the head of which is accessible for turning from the side of the strip 16 that faces outwardly of the strip 3 or 4.

As mentioned, these straps are spaced from each other and from the upper end of each post 3, 4 a relatively short distance with the upper strap being preferably spaced from the upper end of each of said posts approximately the vertical overall distance between the strips 12, 13 of each beam assembly.

At the corresponding terminating ends of each pair of strips 12, 13 is a vertically extending relatively short angle strip 19 that is integrally connected at its upper end with the upper strip 12 and that is integrally connected with lower strip 13 at a point spaced above the lower terminating end of each strip 19.

The portion of each strip 19 that projects downwardly below lower strip 13 is sufficiently long to extend past the lower strap 16 when the upper strip 12 of each beam assembly is substantially even with the upper end of each post 3, 4.

Each angle strip 19 has sides that are of sufficiently less width than the widths of the sides 6, 7 of each post 3, 4 to nest within the reentrant angle formed by sides 6, 7 and to slide downwardly between the straps 16, 15 and the sides of posts 3, 4. As seen in FIG. 2 the lower sides of the lower strips 13 are horizontal and rest on the upper straps 15 when the strips 19 are in position between the straps 15, 16 and the sides 6, 7 of each post 3, 4, while the upper strips 12 are positioned so that one of the sides 20 thereof is horizontal and is uppermost and flush with the upper ends of posts 3, 4. The other sides of the strips 12, 13 may be coplanar and vertically disposed and welded to one of the sides of each vertical connector strip 19 with the terminating ends of strips 12, 13 extending to the other side of each connector strip 19 and integrally connected with the latter. The upper side of each strip 12 may be apertured at 21 for sheet metal screws or any other desired fastening means that extends through the roofing sheets 22 of the patio room to secure sheets 22 to the beam members.

Other beam members 23 may extend between a pair of the opposed beam assemblies and their ends may have connecting structure corresponding to the strip 19 which would be secured to the end of each beam member 23, and a short receiving channel strip corresponding to the upper end portion of each post 3 would be secured to each of the two opposed beam assemblies at 25.

It is seen from the foregoing that the connector structure is embodied in the upper portions of posts 3, 4 that include straps 15, 16 and the vertical angle strips 19 that are connected with the beam assemblies.

By tightening the screws 17 after the strips 19 are in position, the post assemblies and beam assemblies are locked together.

The ease of assembly, economy of manufacture, and rigidity of structure is apparent. There is no hoisting of the angle strips 19 relative to the strips 3, 4 and the beam assemblies are uniformly supported on the upper straps 15.

FIG. 3 is illustrative of a tighter structure than is illustrated in FIGS. 1, 2, and in this structure, the beam assemblies are replaced by single angle strips 26 connected at their ends with a depending angle strip 27 that substantially corresponds to angle strip 19 that is part of the connector.

Instead of the corner post assemblies of FIGS. 1, 2, a single vertical angle strip 24 provides the corner post 28, and instead of a pair of straps 15, 16 there is a single strap 29 that corresponds in structure to strap 16 having a screw 30 that corresponds in structure and function to screw 17.

This strap 29 is preferably spaced below the upper end of the post 28 a distance approximately equal to the width of the side 31 of each strip 26 that depends vertically from the upper horizontal sides 32, the latter being apertured, if desired, for holding screws or bolts for roofing panels or other means.

As seen in FIG. 3, the lower ends of the posts 28 may be formed with a horizontal, apertured foot 33 for bolting to a foundation or floor.

There are structures where other intermediate, horizontally extending strips similar to strips 26 may be needed at points intermediate the upper and lower ends of the posts 28, and in this case other straps 34, that need not be apertured, unless desired, are welded to the posts to receive vertical connector strips corresponding to strips 27. Such straps 34 may carry shelving on the strips that carry the vertical connector strips, and the posts 28 may be apertured wherever desired, as at 35 for receiving sheet metal screws that may connect outside sheathing to the posts. The sides 31 of the upper strips 26 may also be apertured to receive sheet metal screws extending through sheathing.

FIG. 4 is a fragmentary isometric view, partly in cross section of the upper portion of a corner post of a design that is different from that of FIGS. 2, 3, but which employs the same principle.

In this view, a pair of right angle strips 36, 37 are welded together along one of the longitudinally extending edges of one of the sides of said pair of strips so that the sides of the pair of strips will form two right angle channels at one side of said pair and a central right angle channel on the opposite side of said pair facing oppositely of the side toward which the pair of channels face. The adjacent connected sides of the pair of channels meet at a right angle to each other, and a horizontally extending strap 38 extends across the similarly facing pair of channels and is welded to the edges of the pair of strips 36, 37 in the same position relative to the upper free edges of the pair of strips as strap 29 is positioned relative to the upper free edge of strip or corner post 28 of FIG. 3. This strap 38 is formed with a pair of threaded apertures for a pair of screws 39 each of which functions for the same purpose and in the same manner as screw 30 in FIG. 3.

By this structure, a pair of generally horizontally extending angle strips 41, 42 having relatively short right angle strips 43, 44 depending from and integral with one of their ends may be quickly secured to the upper ends of strips 36, 37 by slipping said strips 43, 44 downwardly behind strap 38 and in nested relation to strips 36, 37. The strips 43, 44 are positioned so that one side of each strip will be vertical with its free longitudinally extending edge resting on the strap 38 while the other side 45 of each strip is horizontal and extends into the room of which posts 36, 37 form a one piece corner post. The horizontal sides 45, and the vertical sides of the strips 41, 42 may be apertured for sheet metal screws or bolts, as desired, for securing cover and side sheets of sheathing thereto, such as indicated at 46, 47 for the side sheets.

The outwardly opening vertical channel formed by the adjoining sides of the pair of strips 36, 37 may have metal straps 50 extending horizontally across said open side of the channel and welded to strips 36, 37 at the junctures between the sides of each pair of said strips.

A vertically elongated wooden member 49 of triangular cross sectional contour is fitted into the outwardly opening channel formed by the adjoining sides of strips 36, 37, and between straps 50 and said sides to provide a nailing strip.

The angle strips 41, 42 extend horizontally at a right angle to each other, and the web or vertically disposed depending side is outermost.

The sheathing 46, 47 as seen in FIG. 4 are panels of corrugated sheet metal with the corrugations extending vertically, and where panel 46 is secured against strip 41 and panel 47 is secured against strip 42 the concave sides of the end corrugations at the corner will generally face the corner posts to overlap each other along the free vertical edges of the points. Nails 75 may be driven through the vertical marginal portion of the sheathing that is outermost relative to the nailing strip, or through both marginal portions, and into the nailing strip to provide a tight engagement between the panels along the outer side of each corner post.

In generally similar fashion corrugated sheathing 76, 77 (FIG. 10) may be secured to angle strips 26 and corner post 28 with sheet metal screws 78. The concave sides of the corrugations at the free vertical edges of the sheathing will face corner post 28 and overlap each other.

FIGS. 5, 6 and 7 show different combinations of the connector means with different forms of members that are to be connected. The same numbers will be applied in each form for the connector structure that is common to all forms.

In each form an angle strip 51 is used that is the same as the angle strip 27 in FIG. 3, or each strip 43, 44 in FIG. 4.

In FIG. 5 an angle strip 42 is secured to strip 51 and extends away from strip 51 at an angle to the latter.

In FIG. 6 a tubular cylindrical member 53 is substituted for strip 52, and in FIG. 7 a tubular member 54 of rectangular cross section is substituted for the angle strip 52 and the cylindrical tubular strip 53 of FIG. 6.

Any other forms of bars or strips than those indicated at 52, 53 and 54 may obviously be used, and in FIG. 5 the strip 52 is inverted compared to strip 32 in FIG. 3.

The strips 51 combined with one of the several forms of projecting bars, strips or tubes form one of the elements of the connector means.

The vertical angle strips 55 of FIGS. 5, 6, 7 are the same, and are the same as the angle strip 28 of FIG. 3 or each strip 36, 37 of FIG. 4. A strap 56 is welded to the free edges of each strip 55 and each strap is formed with an internally threaded aperture for threadedly holding a screw 57, the strap 56 and screw 57 in each instance corresponding to the strap 29 and screw 30 of FIG. 3.

In FIG. 5 the strip 55 is welded to a vertical angle strip 58, but to a surface that is different from the inside surface or surfaces of the strip 28 of FIG. 3.

In FIG. 6 the angle strip 55 is welded to a vertical tubular cylindrical post 59 while in FIG. 7 the angle strip 55 is welded to a side of a vertical rectangular post 60.

The strips 55 form the other connection elements to connect with each of the strips 51, and these strips 55 are in combination with the posts 58, 59, 60.

Any of the various combinations may be used, and still others, such as solid or tubular posts or members of any desired cross sectional contour.

Preferably in each instance the straps 56 function both as stops for positioning the members 52, 53, 54 and as supports for the members 52, 53, 54 and for the load that each member may carry. The screws 57 function as releasable locking means that both prevent accidental withdrawal of the strips 51 but they also hold these strips tightly against the strips 55 to prevent rattling, and to also uniformly position the members 52–54 relative to members 58–60.

FIG. 8 is illustrative of a modified form of connector, in which a vertical right angle strip 62 similar to post 28 of FIG. 3 may be provided. However, in this instance, shorter straps 63 are welded to the sides of each strip 62 in a position spaced from the free edges of the sides of said strip so that the longitudinally extending edges of the strip 62 are free and unobstructed, as are the marginal portions along said edges at the surfaces of the sides defining the reentrant angle. This enables a pair of vertical panels 64 to be positioned at a right angle to each other with their vertically extending marginal portions against the said marginal portions or surfaces of the strip 62.

Each strap 63 is formed with an internally threaded central aperture for a screw 65 that is similar to each screw 30 in FIG. 3. However, a horizontally extending clamping strap 66 is loosely carried by each screw, each strap 66 being apertured to pass the screw.

Where panels 64 are positioned against the sides of the strip 62, each screw 65 having a clamping strap or member thereon is screwed into the aperture in each strap 63, and upon tightening the screws 65, the panels will be clamped against the marginal portions of the sides of strip 62.

The uppermost strap 67 indicated in FIG. 8 may carry screw 68 and a clamping member 66, if desired, or the latter may be omitted. However, this strap 67 and screw 68 will function to lock the depending angle strip 69 to strip 62 so as to function in the same manner as the screw 30 in FIG. 3. The depending angle strip 69 is merely smaller than the angle strip 27 of FIG. 3 since the strap 63 is shorter than strap 29 and is positioned closer to the juncture between the sides of the angle strip forming the post.

Where it is desired to secure rafter angle strips to the horizontally extending beam members carried at the upper ends of vertical posts, the structure disclosed in FIG. 9 may be employed, in which the same connector and locking means is employed as in FIG. 3. In this instance the angle strip 70 that corresponds to the angle strip 27 in FIG. 3, is rigidly connected with the lower end of an upwardly inclined rafter strip 71, and the upper end portion 72 of the post carries the strip 73 and screw 74 that are adapted to engage the strip 70 in the same manner as described for strap 29 and screw 30 of FIG. 3.

From the foregoing description it is seen that the invention is adapted for use in forming many different structures in each of which there is the common structure of a connector comprising a pair of right angle structural strips one adapted to be received within the reentrant angle defined by the perpendicularly disposed sides of the other strip for movement longitudinally thereof and of said other strip, and separate means respectively rigid with said strips engageable with each other at a point in said movement for positioning said one strip in a predetermined position relative to the other strip and for holding said one strip within the other. The screw in each strap provides means carried by one of said separate means for releasably locking said strips together, and it should also be noted that the same strap that carries said screw and which is one of said separate means, also is adapted to function as a load bearing means when said strips are vertical and said one strip is moved downwardly until the rigid member carried thereby engages the strap.

I claim:

1. In combination with a vertical post that includes a first vertically extending, rigid, straight, right angle strip having a pair of adjoining sides at a right angle to each other having longitudinally extending free edges remote from their juncture and which strip terminates at the upper end of said post in a free upper end edge, the side of said strip between said longitudinally extending edges being open:
    (a) a plate integral with said strip extending at least partially across the open side of said strip at a point spaced below the upper free end edge of said strip;
    (b) a second straight, vertical, right angle strip in a position within said first right angle strip between said plate and the sides of said first right angle strip;
    (c) said second strip being vertically movable upwardly from said position and out of said first strip;
    (d) rigid means on said second strip in engagement with said plate supporting said second strip and said rigid means in a predetermined stationary position relative to said first strip;
    (e) said rigid means on said second strip being an elongated structural member extending generally horizontally relative to said first strip.

2. In combination with a vertical post that includes a first vertically extending, rigid, straight, right angle strip having a pair of adjoining sides at a right angle to each other having longitudinally extending free edges remote from their juncture and which strip terminates at the upper end of said post in a free upper end edge, the side of said strip between said longitudinally extending edges being open:
    (a) a plate integral with said strip extending at least partially across the open side of said strip at a point spaced below the upper free end edge of said strip;
    (b) a second straight, vertical, right angle strip in a position within said first right angle strip between said plate and the sides of said first right angle strip;
    (c) said second strip being vertically movable upwardly from said position and out of said first strip;
    (d) rigid means on said second strip in engagement with said plate supporting said second strip and said rigid means in a predetermined stationary position relative to said first strip;
    (e) said rigid means on said second strip including generally horizontally extending elongated structural members projecting substantially at a right angle to each other from the upper end of said one strip;
    (f) a pair of vertically disposed panels respectively secured to said pair of members having vertically extending marginal portions disposed in lapping engaging relation along said one strip at the side of the latter opposite to its open side.

3. In a construction as defined in claim 2,
    (g) means for securing said marginal portions together in said lapping relation and to said post, and
    (h) means for securing said panels to said structural members.

4. In combination with a vertical post that includes a first vertically extending, rigid, straight, right angle strip having a pair of adjoining sides at a right angle to each other having longitudinally extending free edges remote from their juncture and which strip terminates at the upper end of said post in a free upper end edge, the side of said strip between said longitudinally extending edges being open:
(a) a plate integral with said strip extending at least partially across the open side of said strip at a point spaced below the upper free end edge of said strip;
(b) a second straight, vertical, right angle strip in a position within said first right angle strip between said plate and the sides of said first right angle strip;
(c) said second strip being vertically movable upwardly from said position and out of said first strip;
(d) rigid means on said second strip in engagement with said plate supporting said second strip and said rigid means in a predetermined stationary position relative to said first strip;
(e) securing means carried by said plate movable into releasable locking relation with said first strip when said first strip is within said second strip;
(f) a pair of vertical panels at a right angle to each other having adjacent vertical edges and marginal portions adjacent to said vertical edges in engagement with the respective sides of said first strip;
(g) a clamping element carried by said securing means movable therewith into clamping relation with said panels along their adjacent edges for holding said panels against said first strip.

5. In a construction as defined in claim 4,
(h) said securing means being a screw threadedly extending through said plate into engagement with said second strip;
(i) a head on said screw outwardly of said plate, and
(j) said clamping element being a bar loosely supported on said screw between said head and said plate.

6. A corner post structure comprising:
(a) vertically elongated, vertically extending post of substantially W-shape in cross sectional contour transversely thereof providing a pair of laterally outwardly opening right angle V-shaped channels at one side of said post and a single, laterally opening right angle V-shaped channel at the opposite side of said post in which one of the sides of each of said pair of V-shaped channels forms the two right angle sides of said single V-shaped channel;
(b) a rigid strap extending across the open sides of said pair of V-shaped channels rigidly secured to said post at the edges of the sides of said channels along the open sides of the latter;
(c) a pair of relatively short, rigid, vertically extending, separate, right angle strips respectively slidably positioned within said pair of V-shaped channels between said strap and the sides of said channels with the sides of said separate strips in positions corresponding to the positions of the sides of said V-shaped channels;
(d) a pair of horizontally elongated structural members each secured at one of its ends to one of said relatively short right angle strips and said structural members extending divergently away from each other in directions away from said post;
(e) the members of said pair thereof being supported on said strap when said separate right angle strips are within said pair of V-shaped channels.

7. In a construction as defined in claim 6,
(f) a vertically elongated, nailing strip positioned within and extending longitudinally of said single V-shaped channel, and
(g) means rigid with said post securing said nailing strip within said single V-shaped channel.

8. In a construction as defined in claim 6,
(f) said strap being spaced below the upper end of said post, and
(g) said members having uppermost upwardly facing surfaces substantially even with the upper end of said post.

9. In a construction as defined in claim 6,
(f) a pair of vertically disposed panels of corrugated metal having their corrugations extending vertically thereof and having vertical edges;
(g) means securing each of said panels to one of said structural members, with said panels having one of their vertical edges adjacent to each other and with the marginal portions along said edges in lapping relation with one of the surfaces in said respective marginal portions facing said post;
(h) said surfaces facing said post being concave in horizontal cross sectional contour to provide a convexly rounded corner facing outwardly of said post.

References Cited by the Examiner

UNITED STATES PATENTS

| 1,784,572 | 12/30 | Brown | 189—19 |
| 2,162,651 | 6/39 | Thomson | 182—184 X |
| 2,775,805 | 1/57 | Sands | 189—36 X |
| 3,034,610 | 5/62 | Lynch | 189—36 |

HARRISON R. MOSELEY, *Primary Examiner.*